March 20, 1951     S. A. DAVIA     2,545,768
VEHICLE WINDOW WIPER
Filed July 14, 1948
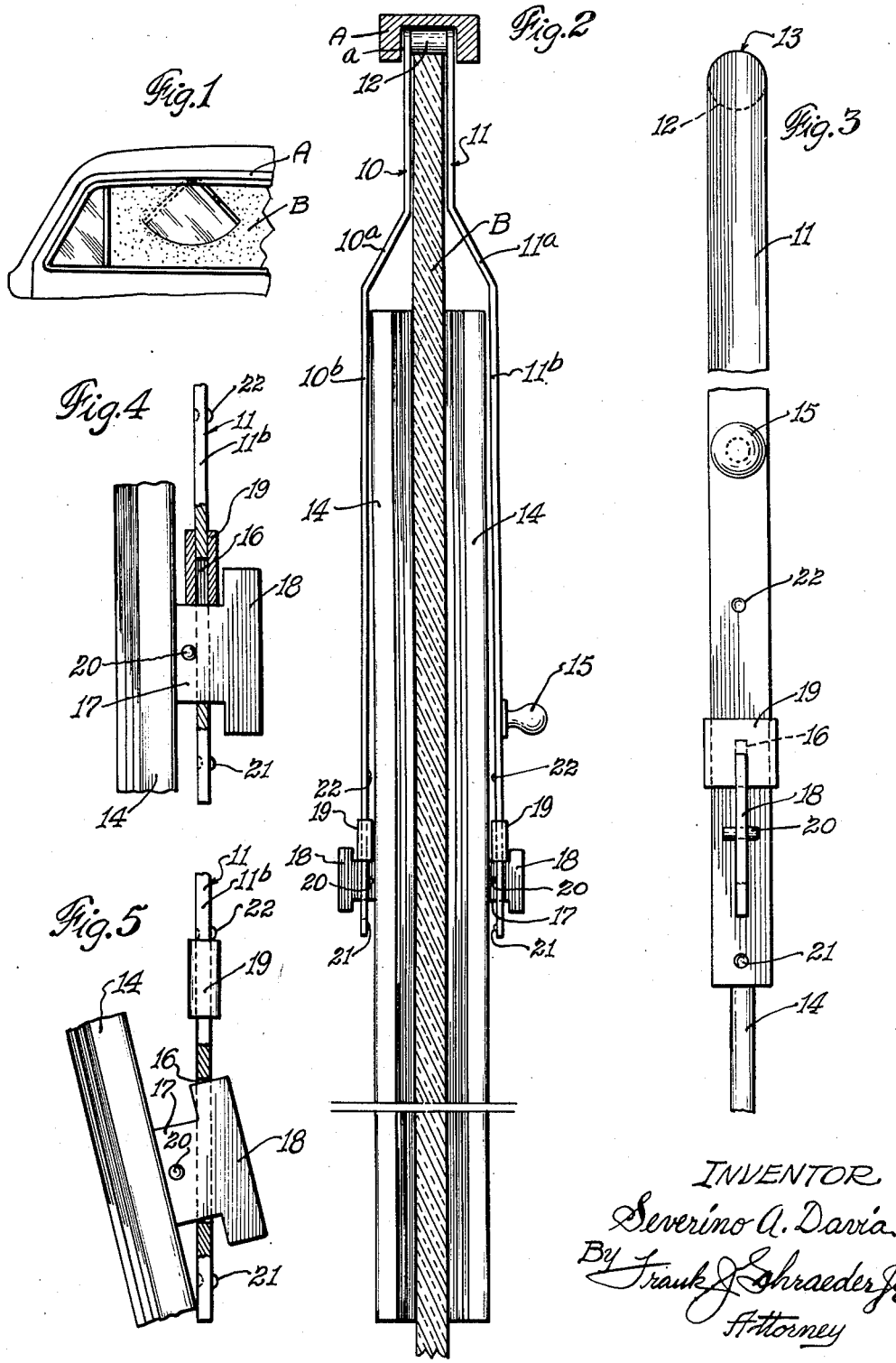
INVENTOR
Severino A. Davia
By Frank J. Schraeder Jr.
Attorney Patented Mar. 20, 1951

2,545,768

UNITED STATES PATENT OFFICE 2,545,768

VEHICLE WINDOW WIPER

Severino A. Davia, Chicago, Ill.

Application July 14, 1948, Serial No. 38,691

3 Claims. (Cl. 15—256)

Vision through windows in the sides of an automobile is often obscured by rain or snow on their exteriors and by fog or mist covering their inner surfaces, but I know of no simple apparatus or device heretofore available to clean these windows easily and satisfactorily.

The object of my invention is to produce a simple and novel cleaning device that can be applied directly to a window pane, such as the sliding pane in an automobile door for example, without interfering with the usual manner of using such pane.

A further object of my invention is to produce a simple and novel cleaning device for a slidably mounted window pane that is adapted to be applied to the latter by simply slipping it over an edge of the same, without using tools or fastenings of any kind.

A further object of my invention is to produce a simple and novel cleaning device for a window pane that can be slipped over an edge of the pane and be adjusted lengthwise of such edge to vary the location of the area which is to be kept clean.

A further object of my invention is to produce a simple and novel device for application directly to a window pane and to be adapted to clean both sides of the pane simultaneously.

A further object of my invention is to produce a simple and novel cleaning device for a slidable window pane the top of which enters a channel in the body of a door, for example, which can be slipped over the upper edge of the pane and have a portion thereof enter the channel, along with the pane, when the pane is raised.

A further object of my invention is to produce a simple and novel cleaning device for a window pane that is provided with a rocker element adapted to have rocking engagement with an edge of the pane.

A further object of my invention is to produce a simple and novel connection between a squeegee and the movable arm of a window wiper, to provide easy assembly and separation, while locking them securely against unintentional separation.

The various features of novelty whereby the present invention is characterized will hereinafter be pointed out with particularity in the claims; but, for a full understanding of the invention and of its objects and advantages, reference may be had to the following detailed description taken in connection with the accompanying drawing, wherein:

Figure 1 is a side view of a fragment of an automobile body, showing a door having one of my new window wiping devices mounted thereon; Fig. 2 is a vertical section, on a larger scale, through the vertical slidable window pane and the channel above the same in the upper part of the door body, with the wiping device shown in elevation; Fig. 3 is a slightly enlarged front view of the wiping device; Fig. 4 is a view on a still larger scale, showing a fragment of the device, partly in section and partly in elevation, at the connection between one of the arms and the corresponding squeegee; and Fig. 5 is a view similar to Fig. 4, illustrating the parts during the act of separating or assembling the arm and the squeegee.

Referring to the drawing, A represents a door in the side of an automobile and B one of the usual vertically slidable glass windows with which such doors are provided. The door may, however, be said to represent any part of the vehicle body that contains a vertically slidable window. When the window is raised the upper marginal portion enters a channel $a$ in the door structure.

The particular cleaning device illustrated comprises a narrow elongated U-shaped member adapted to be slipped, upside down, over the upper edge of the pane, together with squeegees on the free ends of the arms of the U. This member is preferably composed of two arms 10 and 11, of thin, metallic strip material connected together at corresponding ends by a short cylindrical piece 12, to which the arms are fixed; the arms being shaped at said ends to provide end edges 13 that are continuations of one half of the cylindrical surface of element 12. The upper parts of the arms are spaced apart a distance only slightly greater than the thickness of the window or pane and, because they are thin, can move up into the channel $a$ when the window is raised. Therefore, when the window is up, the device is held against removal but can rock freely about the element 12 on the upper edge of the glass.

On the inner side of each arm is a squeegee 14 of any usual or suitable construction, each squeegee being detachably connected at its middle to the corresponding arm. The arms are preferably formed of spring metal so that the squeegees are yieldingly pressed against the glass. The arm that is on the inner side of the window has thereon a finger piece or knob 15 by means of which the device may be rocked back and forth, as indicated in Fig. 1. If a slight downward pressure is applied to the knob while the device is being oscillated, the device will not creep along the edge of the glass; but if it is desired to shift the device bodily to select some particular area to be wiped, one need only make sure that the window has not been pressed up hard enough to pinch the rocking element, in order to be able to slide the device along the supporting edge of the window.

The arms are spaced only so far apart at their upper ends as is necessary to admit the pane of glass to enter between them, whereas they diverge from each other, at 10ª and 11ª, not far from the closed end of the U, to space the remaining portions 10ᵇ and 11ᵇ apart sufficiently to make room for the squeegees between the same and the glass.

Although the squeegees may be attached to the arms in any desired manner, I prefer to use the means that I have illustrated whereby the squeegees are rendered quickly detachable for renewal or repair without the use of tools. Thus, each arm has near its lower end an elongated, axial slot 16, and each squeegee has at the middle a projecting T-shaped lug or connection element comprising a wide, laterally extending short flat stem 17 and a narrow head or cross piece 18 at the free end of the stem disposed perpendicularly to the stem and longer than the width of the stem and longer than the length of the slot 16. The parts are so proportioned that when a squeegee is canted, as in Fig. 5, the head of the T-shaped lug can be passed through the slot in the corresponding arm. Then, when the squeegee and arm are brought into parallelism, the head cannot escape through the slot. In order to prevent the squeegees from tilting far enough to allow them accidentally to free themselves, there is placed on each arm a sleeve 19 that is slidable along the arm and can drop down between the corresponding squeegee and the head portion of the lug on the latter, coming to rest on the stem part of the lug, as in Figs. 2–4. The thickness of the sleeve is less than the length of one of the stems 17, so that each squeegee is sufficiently loose to adjust itself to the surface over which it is to sweep. For the purpose of providing a definite fulcrum on which a squeegee may rock, a short round pin 20 extends through and projects from both sides of the stem portion of the attaching lug. This pin bears against the inner face of the corresponding arm when the device is in place on a window, the yielding pressure of the arm being transmitted to the squeegee through this pin.

To prevent the sleeve from dropping off its arm when the corresponding squeegee is taken off, I deform the metal of the arm near its free end to create a little projection 21. A similar projection 22, above the slot, keeps the sleeve from moving up too far.

The wiper may be placed on a window and left there indefinitely, as its grip on the glass is sufficient to hold it on the window when the latter is open. However, since the device is relatively small, it may be stored in some usual pocket or compartment until its use is required.

One advantage possessed by my device is that, when only one is available, it may be applied to any one of the sliding panes in the sides of an automobile, namely, where its use is most desirable.

The operation of my device has already been explained more or less fully. Attention is again called, however, to the facts that both sides of the glass are cleaned simultaneously, that the device may be shifted along the upper edge of a window or pane, and that the device will not creep, during rocking, with the window closed.

It should also be noted that my device is very simple and sturdy, the body portion being composed of two flexible metallic arms and a small, round connecting piece; and the connections for the squeegees needing no change in the construction of the arms except the provision of slots therein.

I claim:

1. In a window wiper, a pair of flat, flexible metallic strip arms rigidly connected together at corresponding upper ends and each having a longitudinal slot therein near the opposite end thereof, a wiping element carried on each of said arms having a flat, T-shaped projection extending through said slot, each T-shaped projection comprising a short flat lateral stem fixed at one end to the arm and extending through the slot in the arm and at its free end having a perpendicularly disposed cross piece formed intermediate its ends integrally with said stem, said cross piece being longer than the lateral length of said stem and longer than said slot, and an element slidable on each of said arms into a position between the cross piece on the projection and the adjacent side of the arm.

2. A window wiper comprising a pair of flat, metallic strip arms rigidly connected together at their upper ends and each having a longitudinal slot therein near the lower end thereof, a squeegee carried on the lower end of each arm, a flat projection on each arm substantially longer than the thickness of the arm and provided with a stem portion fixed to the squeegee and extending through said slot, a head on the free end of the stem having a portion extending above the stem, a sleeve slidable on the arm into a position between the head on said projection and said arm.

3. A window wiper as set forth in claim 2, that has, in addition, a pin extending transversely through each of said stems at a distance from the head greater than the thickness of the sleeve, said pin providing a rocking bearing for the squeegee against the arm.

SEVERINO A. DAVIA.

REFERENCES CITED

The following references are of record in the file of this patent:

UNITED STATES PATENTS

| Number | Name | Date |
| --- | --- | --- |
| 57,656 | Alden | Sept. 4, 1866 |
| 1,931,098 | Anderson | Oct. 17, 1933 |

FOREIGN PATENTS

| Number | Country | Date |
| --- | --- | --- |
| 28,251 | France | Oct. 3, 1923 |